(12) United States Patent
Sousa et al.

(10) Patent No.: US 7,938,435 B2
(45) Date of Patent: May 10, 2011

(54) JUVENILE STROLLER WITH REMOVABLE CHILD CARRIER

(75) Inventors: David Sousa, Tiverton, RI (US); Donald Hendry, Rockland, MA (US); Gaetano Daniel DeSimone, Peabody, MA (US); Joseph Brewin, Franklin, MA (US)

(73) Assignee: Cosco Management, Inc., Wilmington, DE (US)

( * ) Notice: Subject to any disclaimer, the term of this patent is extended or adjusted under 35 U.S.C. 154(b) by 547 days.

(21) Appl. No.: 12/058,425

(22) Filed: Mar. 28, 2008

(65) Prior Publication Data

US 2009/0243261 A1 Oct. 1, 2009

(51) Int. Cl.
*B62B 7/14* (2006.01)
(52) U.S. Cl. .................. 280/658; 280/648; 280/47.4
(58) Field of Classification Search ............... 280/42, 280/47.38, 47.4, 642, 643, 644, 647, 648, 280/650, 658
See application file for complete search history.

(56) References Cited

U.S. PATENT DOCUMENTS

| | | | | |
|---|---|---|---|---|
| 4,157,839 A * | 6/1979 | Lahti et al. | ............. | 280/642 |
| 5,558,357 A | 9/1996 | Wang | | |
| 5,676,386 A * | 10/1997 | Huang | ............. | 280/30 |
| 5,772,279 A * | 6/1998 | Johnson, Jr. | ............. | 297/130 |
| 5,794,951 A * | 8/1998 | Corley et al. | ............. | 280/30 |
| 5,863,061 A | 1/1999 | Ziegler et al. | | |
| 5,865,447 A * | 2/1999 | Huang | ............. | 280/30 |
| 5,876,046 A * | 3/1999 | Courtney et al. | ............. | 280/30 |
| 5,947,555 A * | 9/1999 | Welsh et al. | ............. | 297/130 |
| 6,241,274 B1 * | 6/2001 | Huang | ............. | 280/642 |
| 6,286,844 B1 * | 9/2001 | Cone et al. | ............. | 280/47.41 |
| 6,331,032 B1 * | 12/2001 | Haut et al. | ............. | 297/130 |
| 6,409,205 B1 * | 6/2002 | Bapst et al. | ............. | 280/642 |
| 6,428,034 B1 * | 8/2002 | Bost | ............. | 280/650 |
| 6,478,327 B1 * | 11/2002 | Hartenstine et al. | ............. | 280/642 |
| 6,533,309 B2 | 3/2003 | Lin | | |
| 6,666,473 B2 * | 12/2003 | Hartenstine et al. | ............. | 280/647 |
| 6,893,040 B2 * | 5/2005 | Hou et al. | ............. | 280/642 |
| 7,032,922 B1 * | 4/2006 | Lan | ............. | 280/648 |
| 7,267,359 B1 * | 9/2007 | Yang et al. | ............. | 280/642 |
| 7,377,537 B2 * | 5/2008 | Li | ............. | 280/650 |
| 7,431,395 B2 * | 10/2008 | Morgan et al. | ............. | 297/219.12 |
| 7,475,900 B2 * | 1/2009 | Cheng | ............. | 280/642 |
| 7,681,894 B2 * | 3/2010 | Santamaria | ............. | 280/47.38 |
| 7,766,366 B2 * | 8/2010 | Li | ............. | 280/642 |

FOREIGN PATENT DOCUMENTS

| | | |
|---|---|---|
| DE | 3839660 | 5/1990 |
| EP | 1346900 | 9/2003 |
| EP | 1366968 | 12/2003 |
| EP | 1466810 | 10/2004 |

* cited by examiner

*Primary Examiner* — Hau V Phan
*Assistant Examiner* — Bridget Avery
(74) *Attorney, Agent, or Firm* — Barnes & Thornburg LLP

(57) ABSTRACT

A multi-seat juvenile stroller including a first seat, second seat, and a rolling stroller frame. The second seat includes a mobile infant carrier.

26 Claims, 7 Drawing Sheets

US 7,938,435 B2

JUVENILE STROLLER WITH REMOVABLE CHILD CARRIER

BACKGROUND

The present disclosure relates to multi-seat juvenile strollers. In particular, the present disclosure relates to a stroller including a first seat and a second seat that is used after removal of the first seat.

SUMMARY

A multi-seat juvenile stroller in accordance with the present disclosure includes a first seat, second seat, and a rolling stroller frame. The first seat includes a removable child-support sling and the second seat includes a mobile infant carrier. The removable child-support sling is used for movement with the rolling stroller frame and can be removed by a user. Once the child-support sling is removed, the mobile infant carrier can be installed on the stroller and used infants.

In illustrative embodiments, a sling mount is coupled to a mount-support bar on the stroller frame. The sling mount is configured to couple temporarily the removable child-support sling to the stroller frame in a first-seat space through the use of a fastener. Upon removal of the child-support sling, the second seat can be mounted onto the frame in the first-seat space using a second-seat mount means.

In illustrative embodiments, the sling mount includes a first side web coupled to a first rail of the mount-support bar, a second side web coupled to a second rail of the mount-support bar, and a lower web coupled to a center rail of the mount-support bar. The removable child-support sling is arranged to lie in a space defined by the first side, second side, and lower webs.

In illustrative embodiments, the fastener includes a first and second side means for temporarily coupling first side, second side, and lower web of the sling mount to the removable child-support sling. The first and second side means of the fastener include an inside zipper track coupled to the removable child-support sling and an outside zipper track coupled to the sling mount. The outside zipper track is configured to mate with inside zipper track using at least one sliding piece.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
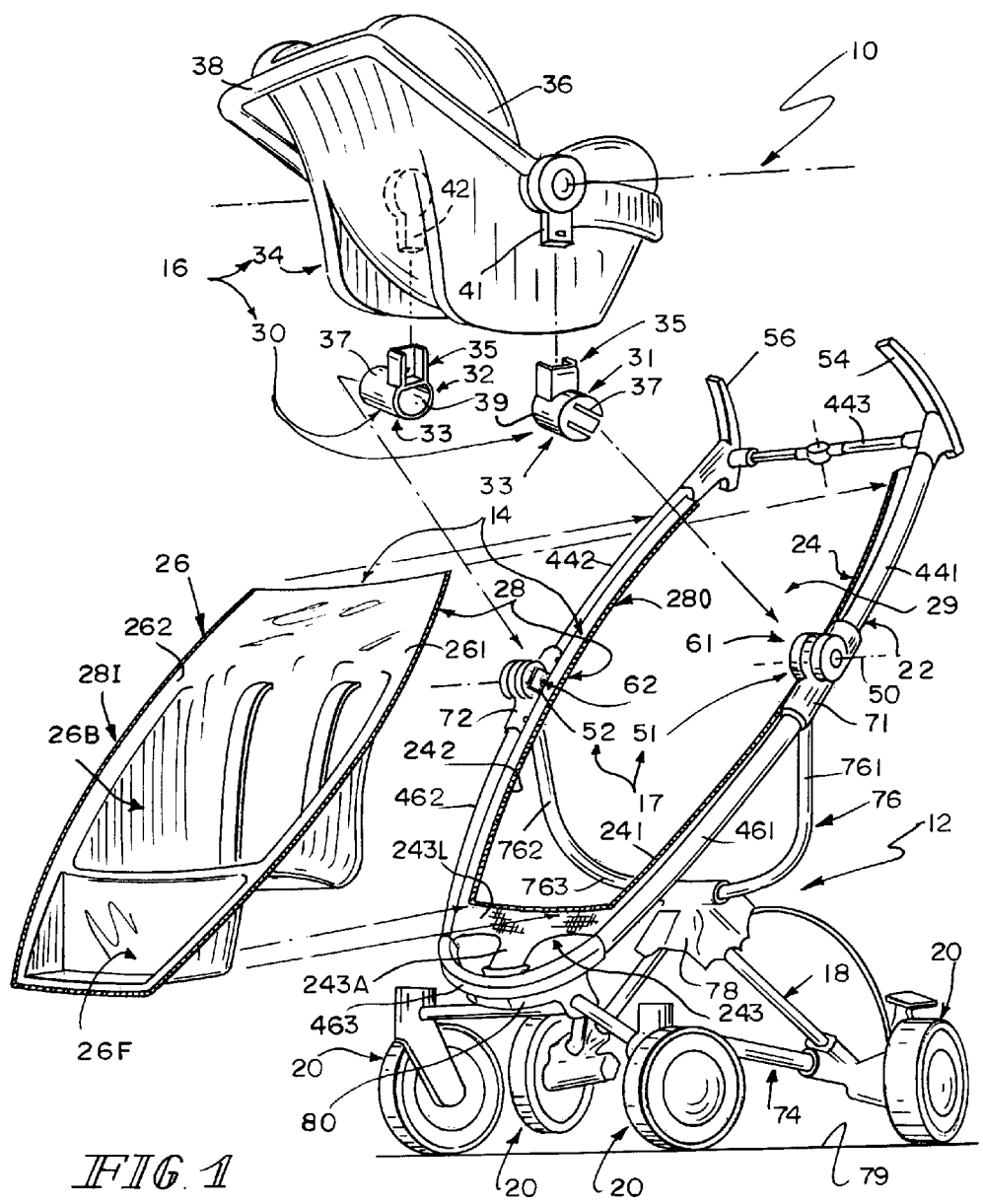
FIG. 1 is a perspective view of a multi-seat juvenile stroller in accordance with the present disclosure showing a stroller frame, a first seat including a U-shaped sling mount coupled to the stroller frame, a removable child-support sling formed to include a body-receiving cavity and an underlying foot-receiving cavity, and a fastener configured to couple the removable child-support sling to the sling mount to anchor the removable child-support sling to the stroller frame, and a second seat including a mobile infant carrier and first and second carrier mounts adapted to be coupled to companion first and second mount anchors coupled to hinge units coupled to the stroller frame to anchor the mobile infant carrier to the stroller frame once the removable child-support sling has been separated from the U-shaped sling mount coupled to the stroller frame.

A multi-seat juvenile stroller 10 in accordance with the present disclosure includes a rolling stroller frame 12, a forward-facing first seat 14, and a rearward-facing second seat 16 as suggested in FIG. 1. Forward-facing first seat 14 is coupled to rolling stroller frame 12 as suggested in FIG. 2 to establish a first seating mode of stroller 10. Alternatively, rearward-facing second seat 16 can be mounted on a second-seat mount 17 coupled to rolling stroller frame 12 as suggested in FIG. 3 to establish a second seating mode of stroller 10. Illustrations of components and component installation techniques associated with first seat 14 are provided in FIGS. 4-7.

Figure 4:
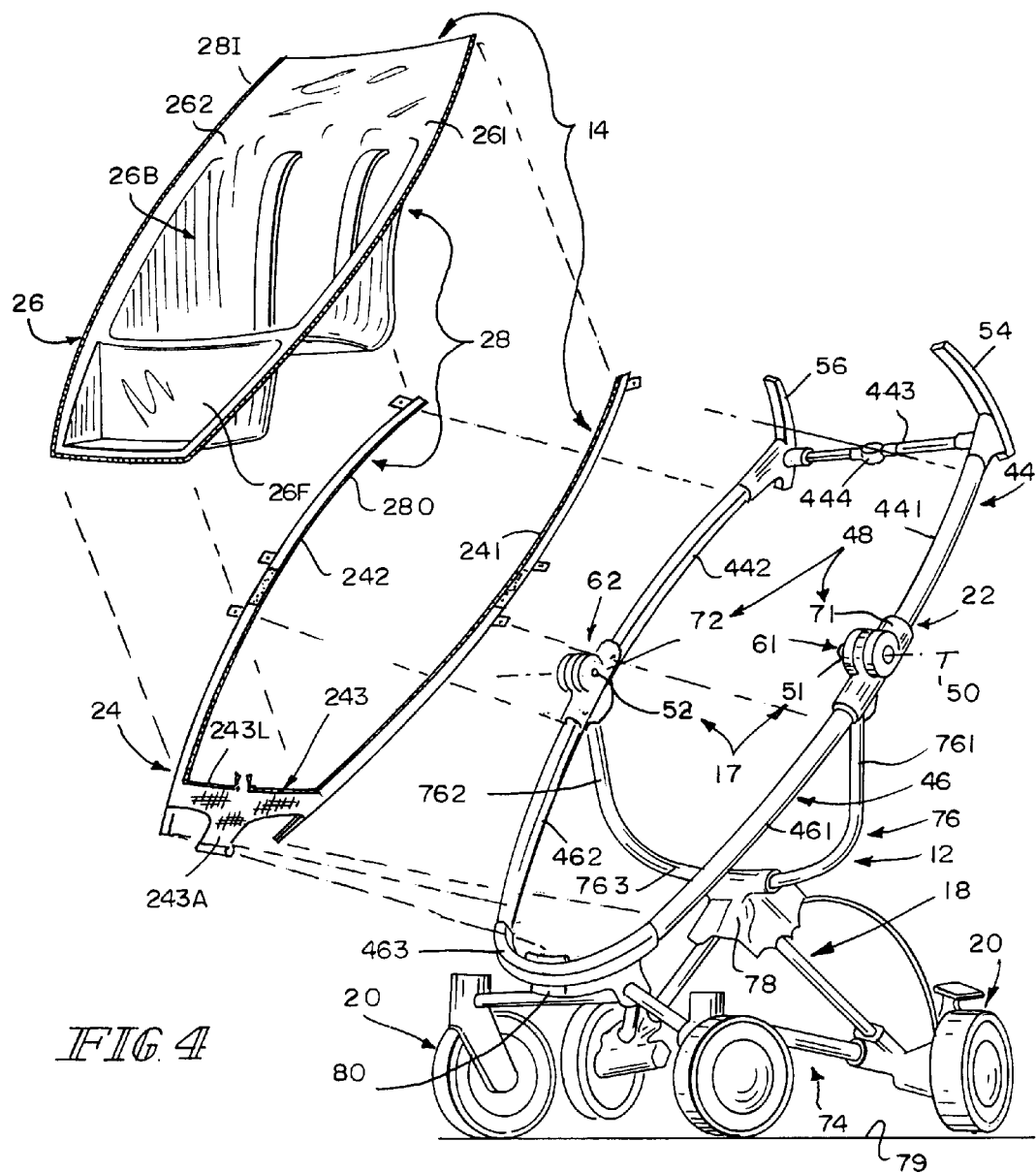
FIG. 4 is an exploded perspective assembly view of components used to establish the first seat on the stroller frame and showing the U-shaped seat mount, the removable child-support sling, a inside zipper track of the fastener coupled to an outer edge of the removable child-support sling, and a outside zipper track of the fastener coupled to an inner edge of the U-shaped sling mount.

Rolling stroller frame 12 includes a base 18, wheels 20 coupled to base 18, and a mount-support bar 22 coupled to base 18 as shown, for example, in FIGS. 1 and 4. First seat 14 is coupled to mount-support bar 22 in an illustrative manner shown in FIG. 1 to produce the stroller shown in FIG. 2. Second seat 16 is coupled to mount-support bar 22 in an illustrative manner also shown in FIG. 1 to produce the stroller shown in FIG. 3.

As suggested in FIG. 4, first seat 14 includes a sling mount 24 and a removable child-support sling 26. Sling mount 24 is configured to be coupled to mount-support bar 22 of frame 12 and remain in that mounted position in both of the first-seat mode shown in FIG. 2 and the second-seat mode shown in FIG. 3.

Figures 2, 3:
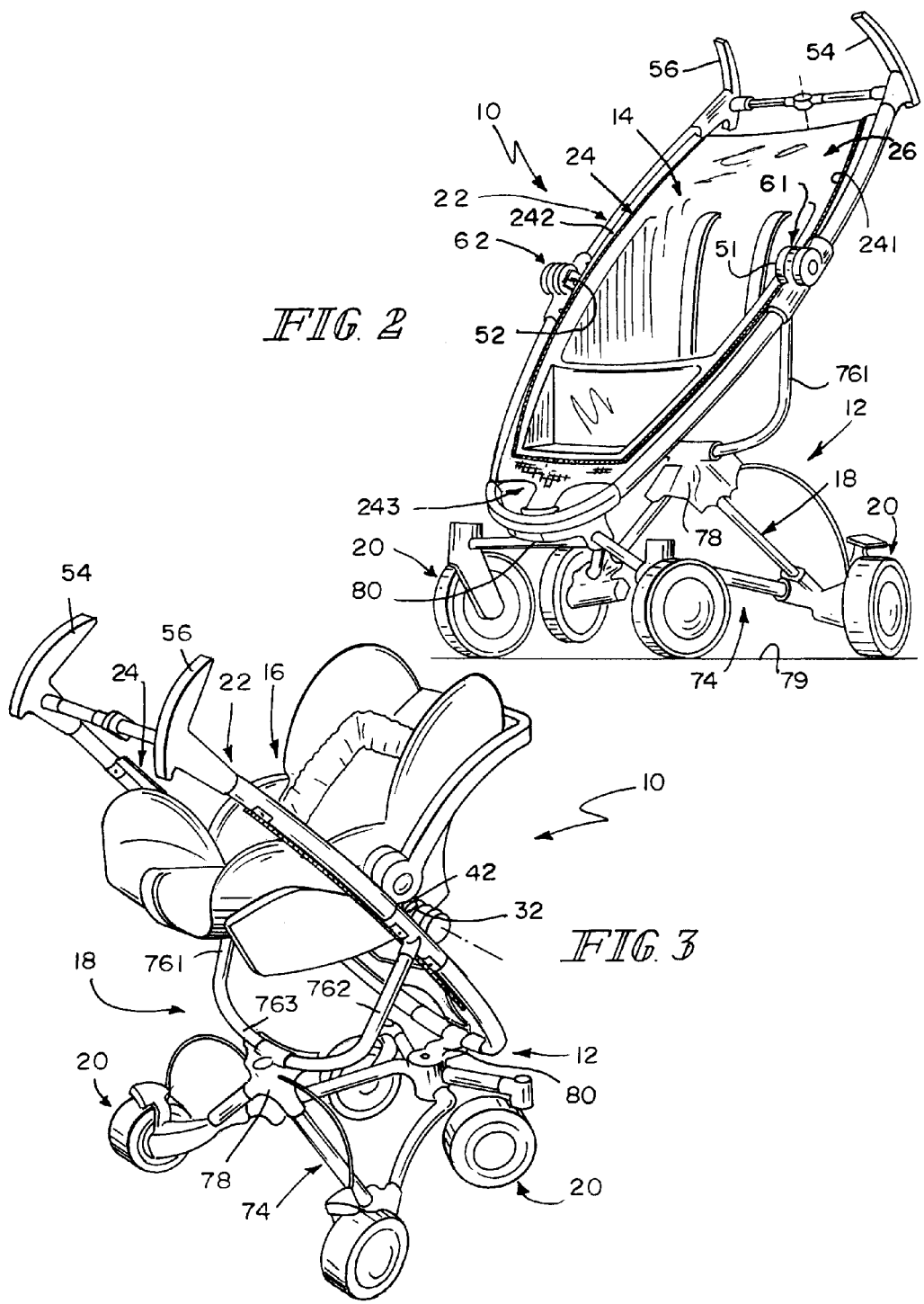
FIG. 2 is a perspective view similar to FIG. 1 showing the removable child-support sling oriented to face in a forward direction relative to two push handles included in the stroller frame and anchored to the stroller frame to establish the first seat.
FIG. 3 is a perspective view similar to FIG. 2 showing the mobile infant carrier oriented to face in a rearward direction and anchored to the stroller frame to establish the carry seat and showing that a seat bottom portion of the mobile infant carrier is arranged to extend through an opening that was created upon separation of the removable child-support sling from the U-shaped sling mount.

First seat 14 further includes a fastener 28 (e.g., a zipper) configured to couple temporarily removable child-support sling 26 to sling mount 24 as suggested in FIG. 1 to hold removable child-support sling 26 in a first-seat space 29 defined by mount-support bar 22 of frame 12 for movement with rolling stroller frame 12 as shown in FIG. 2. Child-support sling 26 remains coupled to sling mount 24 as suggested in FIG. 2 as long as a caregiver desires to configure stroller 10 for use in the first eating mode. Child-support sling 26 later can be separated from sling mount 24 by unfastening fastener 28 to expose or otherwise empty first-seat space 29 bounded, in part, by sling mount 24 so as to allow the caregiver to reconfigure stroller 10 for use in the second seating mode as suggested in FIGS. 1 and 3.

In an illustrative embodiment, second seat 16 includes an infant carrier 34 and first and second carrier mounts 31, 32 as shown, for example, in FIG. 1. First and second carrier mounts 31, 32 cooperate to define a carrier support 30. Carrier support 30 is configured to mate with second-seat mount 17 coupled to rolling stroller frame 12 to support infant carrier 34 in a mounted position on stroller frame 12 (after removal of first seat 14) as suggested in FIGS. 1 and 3.

In the embodiment of FIGS. 1-7, second-seat mount 17 includes a first mount anchor 51 coupled to rolling stroller frame 12. Second-seat mount 17 also includes a second mount anchor 52 coupled to rolling stroller frame 12 and arranged to lie in spaced-apart relation to first mount anchor 51 as suggested in FIG. 1. First and second mount anchors 51, 52 are located above U-shaped sling mount 24 included in first seat 14 and coupled to mount-support bar 22 of stroller frame 12 as suggested in FIG. 1. Mount-support bar 22 is arranged to lie between first and second mount anchors 51, 52 and a U-shaped support bar 76 coupled to mount-support bar 22 and included in rolling stroller frame 12 as suggested in FIG. 4.

Infant carrier 34 includes a shell 36 configured to receive an infant therein, a carry handle 38 coupled to shell 36, and first and second mount receivers 41, 42 coupled to shell 36 as suggested in FIG. 1. It is within the scope of this disclosure to configure infant carrier 34 so that it can be used to transport infants when not mounted on rolling stroller frame 12.

First carrier mount 31 is configured to be coupled to first mount anchor 51 provided at a first site 61 on mount-support bar 22 (using any suitable means) and second carrier mount 32 is configured to be coupled to second mount anchor 52 provided at a second site 62 on mount-support bar 22 (using any suitable means) as suggested in FIG. 1. Such couplings do not interfere with or disrupt the U-shaped sling mount 24 that is coupled to remain with mount-support bar 22 owing to the fact that first and second mount anchors 51, 52 are located above sling mount 24 as shown best in FIG. 1.

As suggested in FIG. 1, in an illustrative embodiment, each of first and second mount carriers 31, 32 includes a horizontal member 33 and a vertical member 35. Horizontal member 33 of first carrier mount 31 includes an outer end 37 adapted to be coupled to first mount anchor 51 at site 61 and an opposite inner end 39. Horizontal member 33 of second carrier mount includes an outer end 37 adapted to be coupled to second mount anchor 52 at site 62 and an opposite inner end 39. Vertical member 35 of first carrier mount 31 is arranged to extend upwardly from inner end 39 of companion horizontal member 33 and mate with first mount receiver 41 of infant carrier 34. Vertical member 35 of second carrier mount 32 is arranged to extend upwardly from inner end 39 of companion horizontal member 33 and mate with second mount receiver 42 of infant carrier 34.

To establish the second seating mode of stroller 10 using rolling stroller frame 12 and second seat 16, first carrier mount 3 of second seat 16 is mated with first mount anchor 51 of second-seat mount 17 and second carrier mount 32 of second seat 16 is mated with second mount anchor 52 of second-seat mount 17 as suggested in FIG. 1. Then, shell 36 of infant carrier 34 is lowered into empty first-seat space 29 bounded, in part, by U-shaped sling mount 24 to position (1) first mount receiver 41 of infant carrier 34 in close proximity to the underlying first carrier mount 31 and (2) second mount receiver 42 of infant carrier 34 in close proximity to the underlying second carrier mount 32. The second seating mode of stroller 10 is then established by mating first carrier mount 31 with first mount receiver 41 and mating second carrier mount 32 with second mount receiver 42 as suggested in FIGS. 1 and 3.

As suggested in FIG. 4, mount-support bar 22 of rolling stroller frame 12 includes an upper frame section 44, a lower frame section 46, and a pivot unit 48 coupled to upper and lower frame sections 44, 46. Pivot unit 48 is configured to provide means for mounting upper frame section 44 for pivotable movement about a pivot axis 50 to allow a user to fold mount-support bar 22 to assume a compact folded storage position (not shown) upon removal of first and second seats 14, 16 from mounted positions on rolling stroller frame 12. In an illustrative embodiment, first and second mount anchors 51, 52 are coupled to pivot unit 48 as suggested in FIG. 4.

In an illustrative embodiment, upper frame section 44 includes a first leg 441, a second leg 442, and a center leg 443 coupled to upper ends of first and second legs 441, 442 as suggested in FIG. 4. Mount-support bar 22 also includes a first push handle 54 coupled to first leg 441 and a second push handle 56 coupled to second leg 442 as suggested in FIG. 4. Center leg 443 is articulated at joint 444 and positioned to lie between push handles 54, 56 as suggested in FIG. 4.

Lower frame section 46 includes a first leg 461, a second leg 462, and a third leg 463 coupled to lower ends of first and second legs 461, 462 as shown, for example, in FIG. 4. Lower frame section 46 is U-shaped and has a concave upwardly facing inner edge in an illustrative embodiment.

Pivot unit 48 includes a first hinge unit 71 arranged to interconnect an upper end of first leg 461 of lower frame section 46 and a lower end of first leg 441 of upper frame section 44 as suggested in FIG. 4. First mount anchor 51 is coupled to first hinge unit 71 as suggested in FIG. 4. In an illustrative embodiment, first legs 441, 461 cooperate to define a first rail of mount-support bar 22. This first rail 441, 461 has a curved, outwardly bowed shape in the illustrative embodiment shown in FIG. 4.

Pivot unit 48 also includes a second hinge unit 72 arranged to interconnect an upper end of second leg 462 of lower frame section 46 and a lower end of second leg 442 of upper frame section 44 as suggested in FIG. 4. Second mount anchor 52 is coupled to second hinge unit 72 as suggested in FIG. 4. In an illustrative embodiment, second legs 442, 462 cooperate to define a second rail of mount-support bar 22. This second rail 442, 462 has a curved, outwardly bowed shape in the illustrative embodiment shown in FIG. 4. A concave inner edge of second rail 442, 462 is oriented to face toward a concave inner edge of first rail 441, 461 as suggested in FIG. 4.

A center rail of mount-support bar 22 is established by third leg or center rail 463 of lower frame section 46 in the illustrated embodiment shown in FIG. 4. Center rail 463 is arranged to extend between first rail 441, 461 and second rail 442, 462 as suggested in FIG. 4. Center rail 446 has a concave upwardly facing inner edge as suggested in FIG. 4.

Base 18 of rolling stroller frame 12, in an illustrative embodiment, shown, for example, in FIGS. 1 and 4, includes a collapsible foundation 74 coupled to wheels 20, a U-shaped bar support 76 coupled to mount-support bar 22, and a first connector 78 coupled to foundation 74 and bar support 76. First connector 78 is configured to locate U-shaped bar support 76 in a stationary position under mount-support bar 22 and above foundation 74 to elevate mount-support bar 22 above ground 79 underlying wheels 20. U-shaped bar support 76 includes an upwardly extending first leg 761 coupled to first hinge unit 71, an upwardly extending second leg 762 coupled to second hinge unit 72 and a curved bight portion 763 interconnecting first and second legs 761, 762 and mating with first connector 78. In an illustrative embodiment, a second connector 80 is included in base 18 and coupled to foundation 74 and center rail 463 of mount-support bar 22 to rigidify mount-support bar 22.

Sling mount 24 includes a first side web 241 coupled to first rail 441, 461 and arranged to lie in first-seat space 29 and a second side web 242 coupled to second rail 442, 462 and arranged to lie in first-seat space 29 as suggested in FIGS. 1 and 4. Removable child-support sling 26 is arranged to lie in a space provided between first and second side webs 241, 242 when child-support sling 26 is held in first-seat space 29 to establish the first seating mode as suggested in FIGS. 1 and 2.

Sling mount 24 is U-shaped in an illustrative embodiment and includes a lower web 243 that is arranged to interconnect first and second side webs 241, 242 and is coupled to center rail 463. Lower web 243 is T-shaped and includes a lateral portion 243L arranged to interconnect first and second side webs 241, 242 and an anchor portion 243A coupled to a middle section of lateral portion 243L and to center rail 463.

Fastener 28 is configured to couple child-support sling 26 to sling mount 24 whenever it is desired to establish the first seating mode. Fastener 28 includes, for example, first side means for temporarily coupling first side web 241 to a first edge 261 of removable child-support sling 26 and second side means for temporarily coupling second side web 242 to a second edge 262 of removable child-support sling 26 as suggested in FIGS. 1, 2, 4, and 5.

A body-receiving cavity 26B is formed in removable child-support sling 26 and is located between first and second edges 261, 262 of removable child-support sling 26. Removable child-support sling 26 is also formed to include a foot-receiving cavity 26F arranged to lie between lower web 243 and body-receiving cavity 26B when removable child-support sling 26 is coupled to sling mount 24.

Rolling stroller frame 12 includes a base 18 and a U-shaped mount-support bar 22 coupled to base 18 for movement therewith. U-shaped mount-support bar 22 includes a first rail 441, 461, a second rail 442, 462 arranged to lie in spaced-apart relation to first rail 441, 446 to define first-seat space 29 therebetween, and a center rail 443 arranged to extend between first and second rails 441, 461 and 442, 462 as suggested in FIG. 4.

When U-shaped sling mount 24 is coupled to mount-support bar 22, first side web 241 is coupled to first rail 441, 461 and arranged to lie in first-seat space 29, second side web 242 is coupled to second rail 442, 462 and arranged to lie in first-seat space 29, and lower web 243 is coupled to center rail 443 and arranged to interconnect first and second side webs 41 and lie in first-seat space 29. Removable child-support sling 26 includes a perimeter edge arranged to extend around body-receiving cavity 26B formed in removable child-support sling 26.

Fastener 28 includes an inside zipper track 28I coupled to the perimeter edge of removable child-support sling 26, an outside zipper track 28O coupled to each of first side, second side, and lower webs 241, 242, 243 and configured to mate with inside zipper track 28I, and at least one sliding piece 28SP mating with inside and outside zipper tracks 28I, 28O. Sliding piece 28SP is configured to provide means for closing an opening to mate the webs of sling mount 24 to the perimeter edge of removable child-support sling 26 by drawing together teeth included in each of the inside and outside zipper tracks 28I, 28O to couple removable child-support sling 26 temporarily to sling mount 24, as suggested, for example, in FIG. 6.

Figure 7:
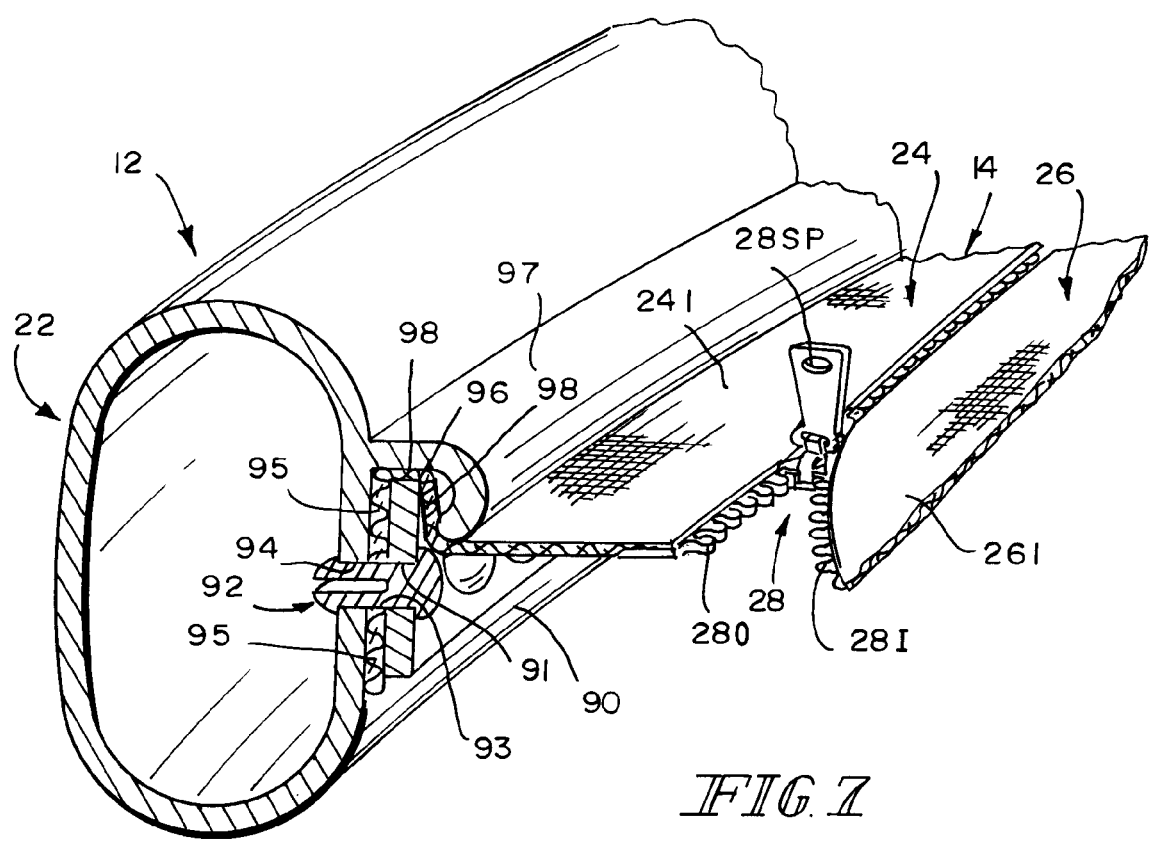
FIG. 7 is an enlarged perspective view taken generally along line 7-7 of FIG. 5 showing means for coupling the U-shaped sling mount of the first seat to the U-shaped mount-support bar of the stroller frame and operation of the fastener to separate the removable child-support sling from the U-shaped sling mount.

Illustrative attachment means for coupling U-shaped sling mount 24 of first seat 14 to mount-support bar 22 of rolling stroller frame 12 is shown in FIG. 7. The attachment means includes a mounting plate 90 formed to include retainer apertures 91 and retainers 92. Each retainer 92 is arranged to pass through a retainer aperture 91 formed in mounting plate 90, a retainer aperture 93 formed in sling mount 24, and a retainer aperture 94 formed in mount-support bar 22 to hold a skirt portion 95 of sling mount 24 in a trapped position between mount-support bar 22 and mounting plate 90 as suggested in FIG. 7. Mounting plate 90 is also arranged to extend into a channel 96 formed in a plate-retainer flange 97 cantilevered to mount-support bar 22 to trap an additional strip 98 of sling mount 24 between mounting plate 90 and plate-retainer flange 97 as shown in FIG. 7.

Figure 5:
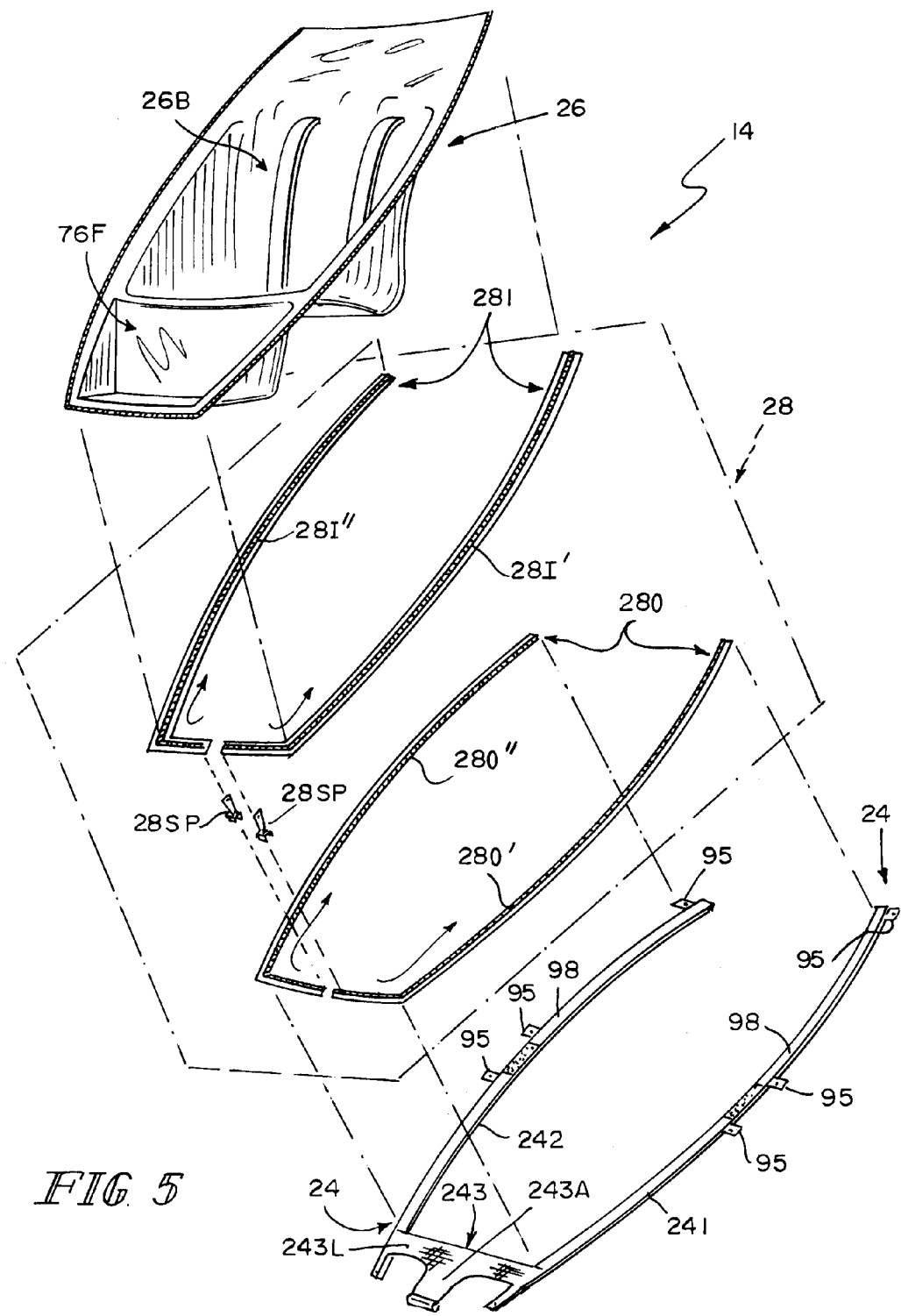
FIG. 5 is an exploded perspective assembly view of components used to establish the first seat and showing the inside zipper track, the outside zipper track, and zipper guides included in the fastener.
Figure 6:
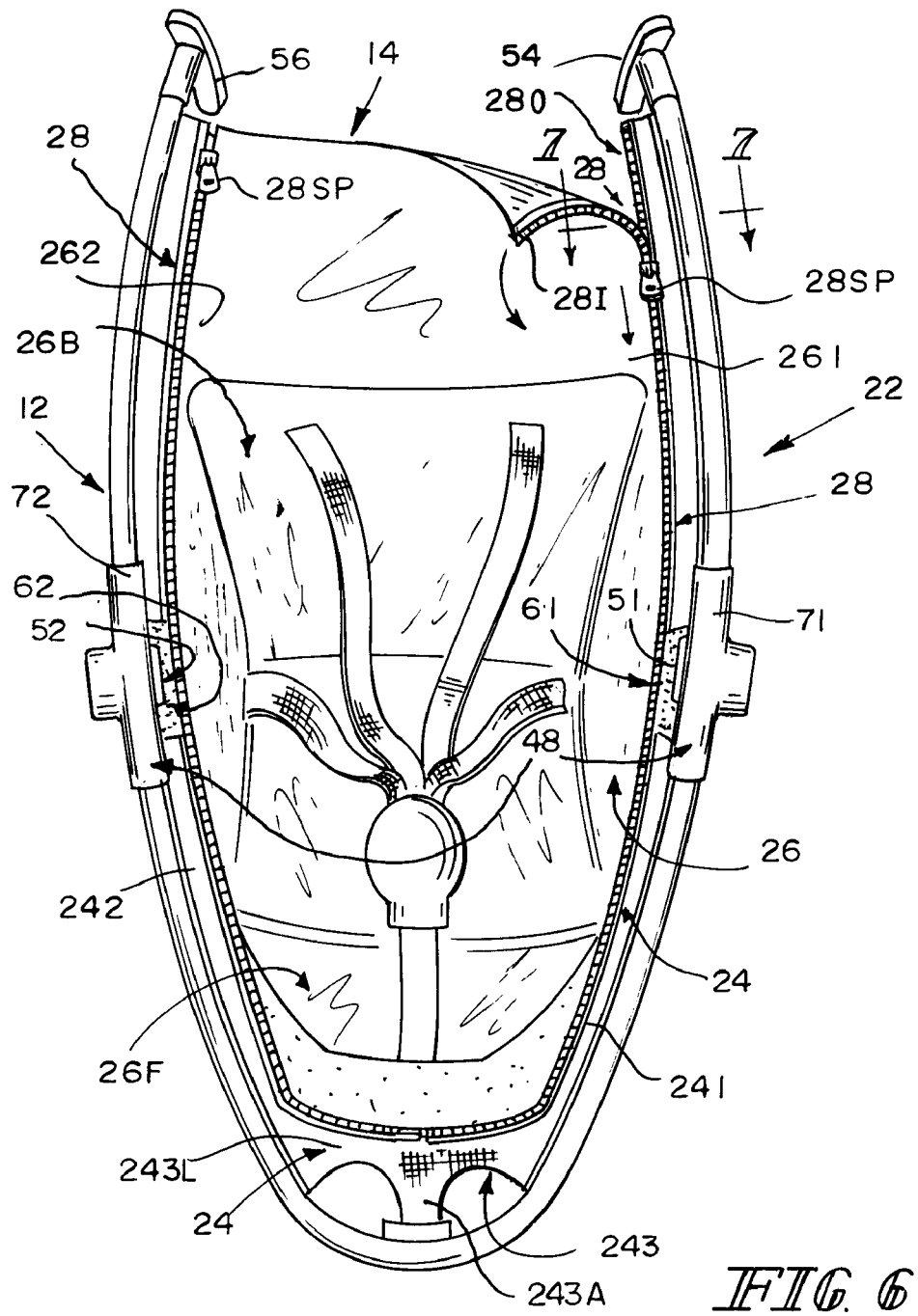
FIG. 6 is a top plan view of the first seat established on a U-shaped mount-support bar included in the stroller frame and showing a portion of the inside zipper track of the fastener being separated from the outside zipper track of the fastener upon movement of the zipper guide of the fastener in a downward direction.

As suggested in FIG. 5, in an illustrative embodiment, skirt portion 95 of sling mount 24 is established by a tab coupled to a strip 98. As also suggested in FIG. 5, inside zipper track 28I includes two separate sections 28I' and 28O'', outside zipper track 28O includes two separate sections 28O' and 28O''. Also, two separate sliding pieces 28SP are provided, one for use with tracks 28I' and 28O' and another for use with tracks 28I'' and 28O''.

Figure 8:
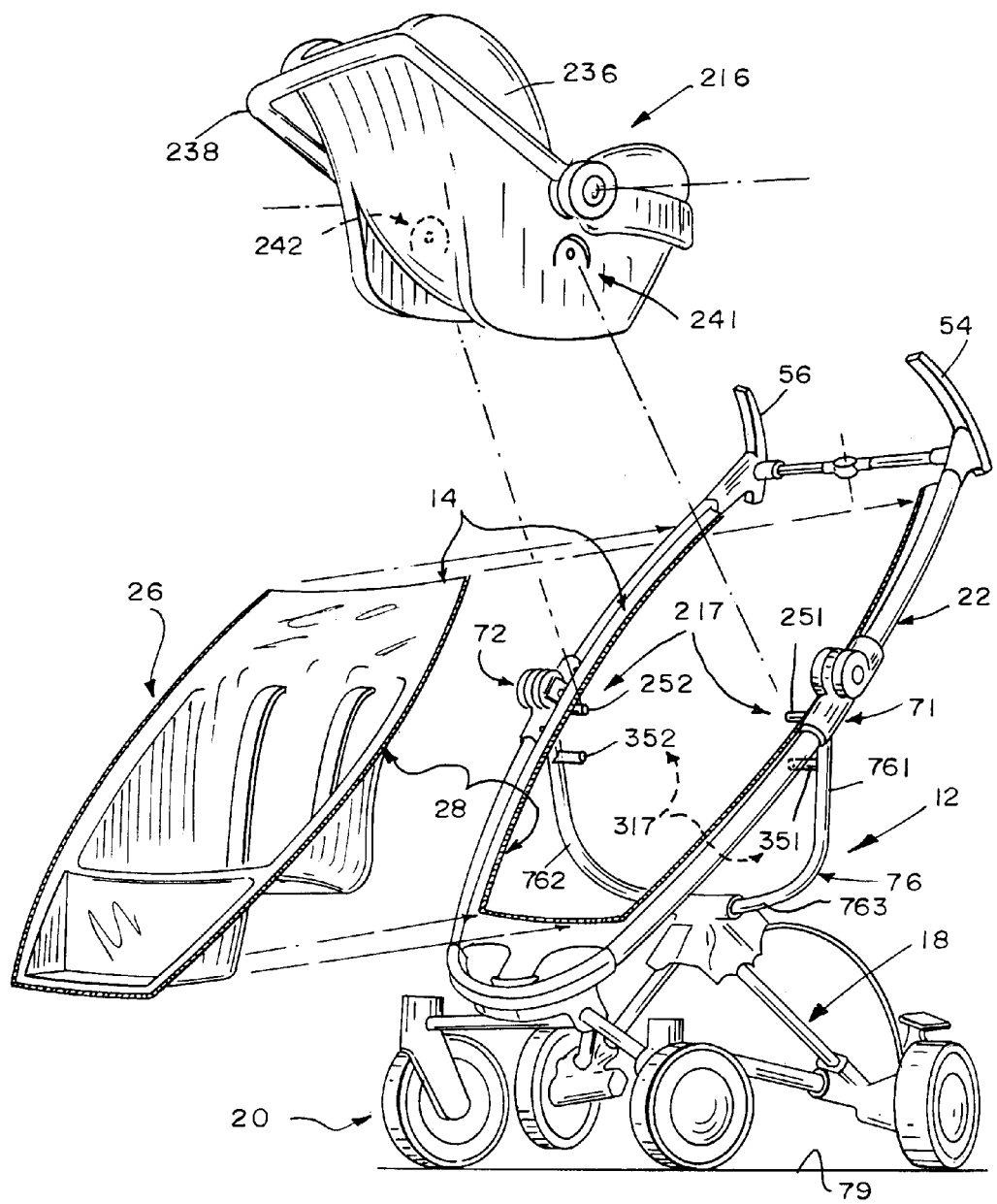
FIG. 8 is a perspective view of a multi-seat juvenile stroller in accordance with another embodiment of the present disclosure showing a second seat comprising a mobile infant carrier and a carrier mount coupled to the stroller frame and configured to include a first set of first and second mount posts (shown in solid lines) located under a U-shaped sling mount included in a first seat and coupled to first and second hinge units and showing that the first and second mount posts are adapted to mate with the mobile infant carrier to anchor the mobile infant carrier to the stroller frame once a removable child-support sling included in the first seat has been separated from the U-shaped sling mount coupled to the stroller frame and also showing an alternative second set of first and second mount posts (shown in phantom lines) coupled to the stroller frame.

A multi-seat juvenile stroller 210 in accordance with other embodiments of the present disclosure is shown in FIG. 8. Juvenile stroller 210 includes rolling stroller frame 12 and forward-facing first seat 14. However, a rearward-facing second seat 216 is configured to be coupled to a second-seat mount 217 coupled to rolling stroller frame 12 and arranged to lie below sling mount 24 of first seat 14 as suggested in FIG. 8.

Second seat 216 including a shell 236 formed to include an interior region sized to receive an infant therein and a first post receiver 241. Second-seat mount 217 includes a first mount post 251 coupled to rolling stroller frame 112 and arranged to extend into first post receiver 241 to mount second seat 216 in a stationary position extending into first-seat space 29 upon removal of child-support sling 26 from first-seat space 29.

Shell 236 of second seat 216 is also formed to include a second post receiver 242. Second-seat mount 217 further includes a second mount post 251 coupled to rolling stroller frame 12 and arranged to extend into second post receiver 242 to cooperate with first mount post 251 to mount second seat 216 in the stationary position extending into first-seat space 29.

In one illustrative embodiment, first and second mount posts 251, 252 are coupled to pivot mount 48. In particular, first mount post 251 is coupled to first hinge mount 71 and second mount post 252 is coupled to second hinge mount 72. Mount posts 251, 252 are configured in any suitable way to provide means for engaging companion post receivers 241, 242 formed in shell 236 to retain a portion of second seat 216 in a stationary position relative to rolling stroller frame 12 extending into first-seat space 29.

In an illustrative alternative embodiment, first mount post 351 (shown in phantom lines) is coupled to first leg 761 of U-shaped bar support 76 as suggested in FIG. 8. Second mount post 352 (shown in phantom lines) is coupled to second leg 762 of bar support and arranged to extend toward first mount post 351 along, for example, a line passing through both of mount posts 351, 352. Both mount posts 351, 352 are arranged to lie below sling mount 24 and above base 18 as suggested in FIG. 8. Also, mount posts 351, 352 are configured in any suitable way to provide means for engaging companion post receivers 241, 242 formed in shell 236 to retain a portion of second seat 216 in a stationary position relative to rolling stroller frame 12 extending into first-seat space 29.

The invention claimed is:

1. A juvenile stroller comprising
a rolling stroller frame,
a first seat including a sling mount coupled to the rolling stroller frame, a removable child-support sling formed to include a body-receiving cavity, and a fastener configured to couple temporarily the removable child-support sling to the sling mount to hold the removable child-support sling in a first-seat space defined by the rolling stroller frame for movement with the rolling stroller frame,
second-seat mount means coupled to the rolling stroller frame for supporting a second seat in the first-seat space defined by the rolling stroller frame after removal of the child-support sling from the first-seat space so that the second seat is mounted in the first-seat space for movement with the rolling stroller frame,
wherein the rolling stroller frame includes a base, wheels coupled to the base, and a mount-support bar coupled to the base and formed to define a boundary of the first-seat space and wherein the sling mount is coupled to the mount-support bar and arranged to lie in a space between the mount-support bar and the child-support sling,
wherein the mount-support bar includes a first rail and a second rail arranged to lie in spaced-apart relation to the first rail to locate the first-seat space therebetween, the sling mount includes a first side web coupled to the first rail and arranged to lie in the first-seat space and a second side web coupled to the second rail and arranged to lie in the first-seat space, and the removable child-support sling is arranged to lie in a space provided between the first and second side webs when the child-support sling is held in the first-seat space, and
wherein the fastener includes first side means for temporarily coupling the first side web to a first edge of the removable child-support sling and second side means for temporarily coupling the second side web to a second edge of the removable child-support sling and wherein the body-receiving cavity of the removable child-support sling is located between the first and second edges of the removable child-support sling.

2. A juvenile stroller comprising
a rolling stroller frame,
a first seat including a sling mount coupled to the rolling stroller frame, a removable child-support sling formed to include a body-receiving cavity, and a fastener configured to couple temporarily the removable child-support sling to the sling mount to hold the removable child-support sling in a first-seat space defined by the rolling stroller frame for movement with the rolling stroller frame,
second-seat mount means coupled to the rolling stroller frame for supporting a second seat in the first-seat space defined by the rolling stroller frame after removal of the child-support sling from the first-seat space so that the second seat is mounted in the first-seat space for movement with the rolling stroller frame,
wherein the rolling stroller frame includes a base, wheels coupled to the base, and a mount-support bar coupled to the base and formed to define a boundary of the first-seat space and wherein the sling mount is coupled to the mount-support bar and arranged to lie in a space between the mount-support bar and the child-support sling,
wherein the mount-support bar includes a first rail and a second rail arranged to lie in spaced-apart relation to the first rail to locate the first-seat space therebetween, the sling mount includes a first side web coupled to the first rail and arranged to lie in the first-seat space and a second side web coupled to the second rail and arranged to lie in the first-seat space, and the removable child-support sling is arranged to lie in a space provided between the first and second side webs when the child-support sling is held in the first-seat space, and
wherein the mount-support bar further includes a center rail arranged to extend between the first and second rails and the sling mount includes a lower web arranged to interconnect the first and second side webs and coupled to the center rail via an anchor portion of the lower web.

3. The juvenile stroller of claim 2, wherein the lower web is T-shaped and includes a lateral portion arranged to interconnect the first and second side webs and an anchor portion coupled to a middle section of the lateral portion and to the center rail.

4. The juvenile stroller of claim 2, wherein the fastener includes means for temporarily coupling the first side web to a first edge of the removable child-support sling, the second side web to a second edge of the removable child-support sling, and the lower web to a lower edge of the removable child-support sling.

5. A juvenile stroller comprising
a rolling stroller frame,
a first seat including a sling mount coupled to the rolling stroller frame, a removable child-support sling formed to include a body-receiving cavity, and a fastener configured to couple temporarily the removable child-support sling to the sling mount to hold the removable child-support sling in a first-seat space defined by the rolling stroller frame for movement with the rolling stroller frame,
second-seat mount means coupled to the rolling stroller frame for supporting a second seat in the first-seat space defined by the rolling stroller frame after removal of the child-support sling from the first-seat space so that the second seat is mounted in the first-seat space for movement with the rolling stroller frame, and
wherein the rolling stroller frame includes a base and a U-shaped mount-support bar coupled to the base for movement therewith, the U-shaped mount-support bar includes a first rail, a second rail arranged to lie in spaced-apart relation to the first rail to define the first-seat space therebetween, and a center rail arranged to extend between the first and second rails, the sling mount includes a first side web coupled to the first rail and arranged to lie in the first-seat space, a second side web coupled to the second rail and arranged to lie in the first-seat space, and a lower web coupled to the center rail and arranged to interconnect the first and second side webs and lie in the first-seat space, the removable child-support sling includes a perimeter edge arranged to extend around the body-receiving cavity formed in the removable child-support sling, and the fastener includes a inside zipper track coupled to the perimeter edge of the removable child-support sling, a outside zipper track coupled to each of the first side, second side, and lower webs and configured to mate with the inside zipper track, and at least one sliding piece mating with the inside and outside zipper tracks to provide means for closing an opening to mate the webs of the sling mount to the perimeter edge of the removable child-support sling by drawing together teeth included in each of the inside and outside zipper tracks to couple the removable child-support sling temporarily to the sling mount.

6. The juvenile stroller of claim 5, wherein the removable child-support sling is also formed to include a foot-receiving cavity arranged to lie between the lower web and the body-receiving cavity when the removable child-support sling is coupled to the sling mount.

7. The juvenile stroller of claim 5, wherein the lower web is T-shaped and includes a lateral portion arranged to interconnect the first and second side webs and an anchor portion coupled to a middle section of the lateral portion and to the center rail.

8. A juvenile stroller comprising
a rolling stroller frame,
a first seat including a sling mount coupled to the rolling stroller frame, a removable child-support sling formed to include a body-receiving cavity, and a fastener configured to couple temporarily the removable child-support sling to the sling mount to hold the removable child-support sling in a first-seat space defined by the rolling stroller frame for movement with the rolling stroller frame, and
second-seat mount means coupled to the rolling stroller frame for supporting a second seat in the first-seat space defined by the rolling stroller frame after removal of the child-support sling from the first-seat space so that the second seat is mounted in the first-seat space for movement with the rolling stroller frame,
further comprising a second seat including an infant carrier and a first carrier mount coupled to the infant carrier and wherein the second-seat mount means is configured to mate with the first carrier mount to mount the second seat in a stationary position extending into the first-seat space upon removal of the child-support sling from the first-seat space,
wherein the rolling stroller frame includes a base, wheels coupled to the base, and a mount-support bar coupled to the base and formed to define a boundary of the first-seat space, the sling mount is coupled to the mount-support bar and arranged to lie in a space between the mount-support bar and the child-support sling, and the second-seat mount means is coupled to the mount-support bar, and
wherein the mount-support bar includes an upper frame including spaced-apart first and second push handles, a separate lower frame, and a pivot unit configured to mount the upper frame to the lower frame for pivotable movement relative to the lower frame about a pivot axis while the sling mount is coupled to the mount-support bar and after removal of the second seat from the rolling stroller frame between an expanded, use position configured to provide the first-seat space and receive one of the first and second seats in the first-seat space and a collapsed-storage position, the sling mount of the first seat is coupled to each of the upper and lower frames, the base further includes a foundation coupled to the wheels and a bar support configured to provide means for connecting the mount-support bar to the foundation of the base of the rolling stroller frame, and the second-seat mount means is coupled to the pivot unit.

9. The juvenile stroller of claim 8, wherein the first carrier mount includes a horizontal member including an outer end coupled to the second-seat mount means and an opposite inner end and a vertical member arranged to extend upwardly from the opposite inner end and mate with the infant carrier.

10. The juvenile stroller of claim 8, wherein the first carrier mount is arranged to lie in spaced-apart relation to wheels included in the rolling stroller frame to locate portions of the sling mount therebetween.

11. The juvenile stroller of claim 8, wherein the rolling stroller frame includes a base, wheels coupled to the base, and a mount-support bar coupled to the base and formed to define a boundary of the first-seat space, the sling mount is coupled to the mount-support bar and arranged to lie in a space between the mount-support bar and the child-support sling, and the first carrier mount is arranged to lie in spaced-apart relation to the wheels to locate a portion of the mount-support bar therebetween.

12. The juvenile stroller of claim 8, wherein the mount-support bar includes a first rail and a second rail arranged to lie in spaced-apart relation to the first rail to locate the first-seat space therebetween, the sling mount includes a first side web coupled to the first rail and arranged to lie in the first-seat space and a second side web coupled to the second rail and arranged to lie in the first-seat space, and the removable child-support sling is arranged to lie in a space provided between the first and second side webs when the child-support sling is held in the first-seat space.

13. The juvenile stroller of claim 8, wherein the second seat includes a shell formed to include an interior region sized to receive an infant therein an'd a first post receiver and wherein the second-seat mount means includes a first mount post coupled to the rolling stroller frame and arranged to extend into the first post receiver to mount the second seat in a stationary position extending into the first-seat space upon removal of the child-support sling from the first-seat space.

14. The juvenile stroller of claim 9, wherein the infant carrier includes a shell formed to include an interior region sized to receive an infant therein and a first mount receiver coupled to the shell and wherein the vertical member of the first carrier mount is arranged to mate with the first mount receiver of the infant carrier.

15. The juvenile stroller of claim 13, wherein the shell of the second seat is also formed to include a second post receiver and the second-seat mount means further includes a second mount post coupled to the rolling stroller frame and arranged to extend into the second post receiver to cooperate with the first mount post to mount the second seat in the stationary position extending into the first-seat space.

16. The juvenile stroller of claim 13, wherein the first mount post is arranged to lie under the sling mount and between the sling mount and wheels included in the rolling stroller frame.

17. The juvenile stroller of claim 13, wherein the rolling stroller frame includes a base, wheels coupled to the base, and a mount-support bar coupled to the base and formed to define a boundary of the first-seat space, the sling mount is coupled to the mount-support bar and arranged to lie in a space between the mount-support bar and the child-support sling, and the first mount post is coupled to the mount-support bar and arranged to extend horizontally.

18. The juvenile stroller of claim 17, wherein the mount-support bar includes a first rail and a second rail arranged to lie in spaced-apart relation to the first rail to locate the first-seat space therebetween, the sling mount includes a first side web coupled to the first rail and arranged to lie in the first-seat space and a second side web coupled to the second rail and arranged to lie in the first-seat space, and the removable child-support sling is arranged to lie in a space provided between the first and second side webs when the child-support sling is held in the first-seat space.

19. The juvenile seat of claim 17, wherein the mount-support bar includes an upper frame including spaced-apart first and second push handles, a separate lower frame, and a pivot unit configured to mount the upper frame to the lower frame for pivotable movement relative to the lower frame about a pivot axis while the sling mount is coupled to the mount-support bar and after removal of the second seat from the rolling stroller frame between an expanded, use position configured to provide the first-seat space and receive one of the first and second seats in the first-seat space and a collapsed-storage position, the sling mount of the first seat is coupled to each of the upper and lower frames, and the first mount post is coupled to the pivot mount.

20. The juvenile seat of claim 17, wherein the shell of the second seat is also formed to include a second post receiver, the second-seat mount means further includes a second mount post coupled to the rolling stroller frame and arranged to extend into the second post receiver to cooperate with the first mount post to mount the second seat in the stationary position extending into the first-seat space, the mount-support bar includes an upper frame including spaced-apart first and second push handles and a separate lower frame, the sling mount of the first seat is coupled to each of the upper and lower frames, the mount-support bar also includes a first hinge unit coupled to the base and to a first leg of each of the upper frame and the lower frame, and a separate second hinge unit coupled the base and to a second leg of each of the upper frame and the lower frame, the first mount post is coupled to the first hinge unit of the mount-support bar, and the second mount post is coupled to the second hinge unit of the mount-support bar.

21. The juvenile seat of claim 17, wherein the mount-support bar includes an upper frame including spaced-apart first and second push handles, a separate lower frame, and a pivot unit configured to mount the upper frame to the lower frame for pivotable movement relative to the lower frame about a pivot axis while the sling mount is coupled to the mount-support bar and after removal of the second seat from the rolling stroller frame between an expanded, use position configured to provide the first-seat space and receive one of the first and second seats in the first-seat space and a collapsed-storage position, the sling mount of the first seat is coupled to each of the upper and lower frames, the base further includes a foundation coupled to the wheels and a bar support configured to provide means for connecting the mount-support bar to the foundation of the base of the rolling stroller frame, and the first mount post is coupled to the bar support.

22. A juvenile stroller comprising
a rolling stroller frame,
a first seat including a sling mount coupled to the rolling stroller, frame, a removable child-support sling formed to include a body-receiving cavity, and a fastener configured to couple temporarily the removable child-support sling to the sling mount to hold the removable child-support sling in a first-seat space defined by the rolling stroller frame for movement with the rolling stroller frame, and
second-seat mount means coupled to the rolling stroller frame for supporting a second seat in the first-seat space defined by the rolling stroller frame after removal of the child-support sling from the first-seat space so that the second seat is mounted in the first-seat pace for movement with the rolling stroller frame,
further comprising a second seat including an infant carrier and a first carrier mount coupled to the infant carrier and wherein the second-seat mount means is configured to mate with the first carrier mount to mount the second seat in a stationary position extending into the first-seat space upon removal of the child-support sling from the first-seat space,
wherein the rolling stroller frame includes a base, wheels coupled to the base, and a mount-support bar coupled to the base and formed to define a boundary of the first-seat space, the sling mount is coupled to the mount-support bar and arranged to lie in a space between the mount-support bar and the child-support sling, and the second-seat mount means is coupled to the mount-support bar, and
wherein the second seat also includes a second carrier mount coupled to the infant carrier, the mount-support bar includes an upper frame including spaced-apart first and second push handles and a separate lower frame, the sling mount of the first seat is coupled to each of the upper and lower frames, the mount-support bar further includes a first hinge unit coupled to the base and to a first leg of each of the upper frame and the lower frame, and a separate second hinge unit coupled to the base and a second leg of each of the upper frame and the lower frame, the second-seat mount means includes a first mount anchor coupled to the first hinge unit and a second mount anchor coupled to the second hinge unit, the first carrier mount is coupled to the first mount anchor, and the second carrier mount is coupled to the second mount anchor.

23. A juvenile stroller comprising
a rolling stroller frame,
a first seat including a sling mount coupled to the rolling stroller frame, a removable child-support sling formed to include a body-receiving cavity,
a fastener configured to couple temporarily the removable child-support sling to the sling mount to hold the removable child-support sling in a first-seat space defined by the rolling stroller frame for movement with the rolling stroller frame,
wherein the rolling stroller frame includes a base, wheels coupled to the base, and a mount-support bar coupled to the base and formed to define a boundary of the first-seat space and wherein the sling mount is coupled to the mount-support bar and arranged to lie in a space between the mount-support bar and the child-support sling,
wherein the mount-support bar includes a first rail and a second rail arranged to lie in spaced-apart relation to the first rail to locate the first-seat space therebetween, the sling mount includes a first side web coupled to the first rail and arranged to lie in the first-seat space and a second side web coupled to the second rail and arranged to lie in the first-seat space, and the removable child-support sling is arranged to lie in a space provided between the first and second side webs when the child-support sling is held in the first-seat space, and wherein the fastener includes first side means for temporarily coupling the first side web to a first edge of the removable child-support sling and second side means for temporarily coupling the second side web to a second edge of the removable child-support sling and wherein the body-receiving cavity of the removable child-support sling is located between the first and second edges of the removable child-support sling.

24. A juvenile stroller comprising
a rolling stroller frame,
a first seat including a sling mount coupled to the rolling stroller frame, a removable child-support sling formed to include a body-receiving cavity,
a fastener configured to couple temporarily the removable child-support sling to the sling mount to hold the removable child-support sling in a first-seat space defined by the rolling stroller frame for movement with the rolling stroller frame,
wherein the rolling stroller frame includes a base, wheels coupled to the base, and a mount-support bar coupled to the base and formed to define a boundary of the first-seat space and wherein the sling mount is coupled to the mount-support bar and arranged to lie in a space between the mount-support bar and the child-support sling,
wherein the mount-support bar includes a first rail and a second rail arranged to lie spaced-apart relation to the first rail to locate the first-seat space therebetween, the sling mount includes a first side web coupled to the first rail and arranged to lie in the first-seat space and a second side web coupled to the second rail and arranged to lie in the first-seat space, and the removable child-support sling is arranged to lie in a space provided between the first and second side webs when the child-support sling is held in the first-seat space, and
wherein the mount-support bar further includes a center rail arranged to extend between the first and second rails and the sling mount includes a lower web arranged to interconnect the first and second side webs and coupled to the center rail via an anchor portion of the lower web.

25. The juvenile stroller of claim 24, wherein the lower web is T-shaped and includes a lateral portion arranged to interconnect the first and second side webs and an anchor portion coupled to a middle section of the lateral portion and to the center rail.

26. The juvenile stroller of claim 24, wherein the fastener includes means for temporarily coupling the first side web to a first edge of the removable child-support sling, the second side web to a second edge of the removable child-support sling, and the lower web to a lower edge of the removable child-support sling.

* * * * *